(12) United States Patent
Jackson (10) Patent No.: US 10,609,054 B2
(45) Date of Patent: Mar. 31, 2020

(54) METHODS, SYSTEMS, AND COMPUTER READABLE MEDIA FOR MONITORING, ADJUSTING, AND UTILIZING LATENCY ASSOCIATED WITH ACCESSING DISTRIBUTED COMPUTING RESOURCES

(71) Applicant: Keysight Technologies Singapore (Sales) Pte. Ltd., Singapore (SG)

(72) Inventor: Stephen Samuel Jackson, Chapel Hill, NC (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 12 days.

(21) Appl. No.: 15/482,672

(22) Filed: Apr. 7, 2017

(65) Prior Publication Data
US 2018/0295144 A1 Oct. 11, 2018

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *G06F 21/55* | (2013.01) | |

(Continued)

(52) U.S. Cl.
CPC .......... *H04L 63/1425* (2013.01); *G06F 11/00* (2013.01); *G06F 21/552* (2013.01); *G06F 21/554* (2013.01); *H04L 43/0864* (2013.01); *H04L 43/10* (2013.01); *H04L 47/283* (2013.01); *H04L 67/10* (2013.01)

(58) Field of Classification Search
USPC .......................................................... 726/23
See application file for complete search history.

(56) References Cited

U.S. PATENT DOCUMENTS

| | | |
|---|---|---|
| 6,868,069 B2 | 3/2005 | Knobbe et al. |
| 7,092,586 B2 | 8/2006 | Vokey et al. |
| (Continued) | | |

FOREIGN PATENT DOCUMENTS

| | | |
|---|---|---|
| CN | 101447861 B | 10/2011 |
| CN | 108737003 A | 11/2018 |
| (Continued) | | |

OTHER PUBLICATIONS

Notice of Allowance and Fee(s) Due for U.S. Appl. No. 14/688,644 (dated Feb. 28, 2018).

(Continued)

*Primary Examiner* — Wasika Nipa
*Assistant Examiner* — Samuel Ambaye (57) ABSTRACT

Methods, systems, and computer readable media for monitoring, adjusting, and utilizing latency associated with accessing distributed computing resources are disclosed. One method includes measuring a first latency associated with accessing a first computing resource located at a first site. The method further includes the measuring a second latency associated with accessing a second computing resource located at a second site different from the first site. The method further includes selectively impairing transmission of packets to or processing of packets by at least one of the first and second computing resources in accordance with a performance, network security, or diagnostic goal.

15 Claims, 7 Drawing Sheets

(51) Int. Cl.
*H04L 12/26* (2006.01)
*H04L 29/08* (2006.01)
*H04L 12/841* (2013.01)

(56) References Cited

U.S. PATENT DOCUMENTS

| | | |
|---|---|---|
| 7,272,750 B2 | 9/2007 | Sirbu |
| 7,633,939 B2 | 12/2009 | Curran-Gray et al. |
| 7,649,912 B2 | 1/2010 | Balasubramanian et al. |
| 7,881,209 B2 | 2/2011 | Beliles, Jr. et al. |
| 8,718,482 B1 | 5/2014 | Roberts |
| 8,767,565 B2 | 7/2014 | Dalmau et al. |
| 9,106,353 B2 | 8/2015 | Hsueh et al. |
| 9,130,945 B2 | 9/2015 | Smith et al. |
| 9,288,777 B2 | 3/2016 | Hollabaugh et al. |
| 9,300,565 B2 | 3/2016 | Robitaille et al. |
| 9,380,070 B1 | 6/2016 | Cain et al. |
| 9,614,689 B2 | 4/2017 | Cook et al. |
| 9,686,169 B2 | 6/2017 | Formby et al. |
| 9,699,051 B2 | 7/2017 | Rata et al. |
| 9,736,804 B2 | 8/2017 | Regev |
| 9,800,595 B2 | 10/2017 | Jackson |
| 9,813,226 B2 | 11/2017 | Bergeron |
| 9,819,553 B2 | 11/2017 | Robitaille et al. |
| 9,923,656 B2 | 3/2018 | Tenea et al. |
| 9,971,620 B2 | 5/2018 | Karnes |
| 10,014,937 B1 | 7/2018 | Di Mola et al. |
| 10,019,333 B2 | 7/2018 | Regev |
| 10,158,441 B1 | 12/2018 | Butterworth et al. |
| 10,181,912 B1 | 1/2019 | Callaghan et al. |
| 10,425,321 B2 | 9/2019 | Joseph et al. |
| 2002/0065929 A1 | 5/2002 | Kamentsky et al. |
| 2002/0093917 A1* | 7/2002 | Knobbe .......... H04L 1/24 370/252 |
| 2003/0105976 A1 | 6/2003 | Copeland, III |
| 2003/0200483 A1 | 10/2003 | Sutton |
| 2004/0190547 A1 | 9/2004 | Gordy et al. |
| 2007/0268938 A1 | 11/2007 | Dowd |
| 2009/0207752 A1 | 8/2009 | Bugenhagen |
| 2009/0217075 A1 | 8/2009 | Adar et al. |
| 2009/0231191 A1 | 9/2009 | Wu et al. |
| 2009/0257354 A1 | 10/2009 | Hannel et al. |
| 2010/0039157 A1 | 2/2010 | Kaeriyama et al. |
| 2010/0098111 A1 | 4/2010 | Sun et al. |
| 2011/0170534 A1 | 7/2011 | York |
| 2011/0199133 A1 | 8/2011 | Yamada |
| 2011/0211473 A1 | 9/2011 | Matityahu et al. |
| 2011/0268097 A1 | 11/2011 | Agrawala et al. |
| 2012/0166327 A1 | 6/2012 | Amicangioli |
| 2012/0275317 A1 | 11/2012 | Geva |
| 2013/0064095 A1 | 3/2013 | Chew et al. |
| 2013/0070777 A1 | 3/2013 | Hutchison et al. |
| 2013/0080817 A1 | 3/2013 | Mihelic |
| 2013/0086250 A1* | 4/2013 | Eskicioglu .......... H04L 12/6418 709/224 |
| 2013/0094515 A1 | 4/2013 | Gura et al. |
| 2013/0170507 A1* | 7/2013 | Hsueh ................ H04L 63/0428 370/503 |
| 2013/0173778 A1 | 7/2013 | Hsy et al. |
| 2013/0212439 A1 | 8/2013 | Stevens et al. |
| 2013/0259049 A1 | 10/2013 | Mizrahi |
| 2013/0265886 A1 | 10/2013 | Leong |
| 2013/0278312 A1 | 10/2013 | Getzin et al. |
| 2013/0329595 A1 | 12/2013 | Scholz |
| 2013/0343207 A1 | 12/2013 | Cook et al. |
| 2013/0347103 A1 | 12/2013 | Veteikis et al. |
| 2014/0006610 A1 | 1/2014 | Formby et al. |
| 2014/0164860 A1 | 6/2014 | Kim |
| 2014/0185632 A1 | 7/2014 | Steiner et al. |
| 2014/0247839 A1 | 9/2014 | Kingsley |
| 2014/0269337 A1 | 9/2014 | Gintis |
| 2014/0297852 A1 | 10/2014 | Shimizu et al. |
| 2014/0304505 A1 | 10/2014 | Dawson |
| 2014/0317288 A1 | 10/2014 | Krueger et al. |
| 2014/0321285 A1 | 10/2014 | Chew et al. |
| 2014/0344930 A1 | 11/2014 | Foley |
| 2015/0016274 A1 | 1/2015 | Holland |
| 2015/0023168 A1 | 1/2015 | Kotecha et al. |
| 2015/0023170 A1 | 1/2015 | Kakadia et al. |
| 2015/0103828 A1 | 4/2015 | Chandhoke et al. |
| 2015/0103832 A1 | 4/2015 | Chandhoke et al. |
| 2015/0103836 A1 | 4/2015 | Chandhoke et al. |
| 2015/0103848 A1 | 4/2015 | Chandhoke et al. |
| 2015/0245306 A1 | 8/2015 | Boehlke |
| 2015/0281025 A1 | 10/2015 | Wallbaum et al. |
| 2016/0065434 A1* | 3/2016 | Janakiraman ....... H04L 43/0852 370/252 |
| 2016/0110211 A1 | 4/2016 | Karnes |
| 2016/0110212 A1* | 4/2016 | Karnes ............... G06F 9/45558 718/1 |
| 2016/0285575 A1 | 9/2016 | Holmeide |
| 2016/0301589 A1 | 10/2016 | Rata et al. |
| 2016/0301599 A1 | 10/2016 | Porfiri et al. |
| 2016/0306726 A1 | 10/2016 | Regev |
| 2016/0309434 A1 | 10/2016 | Regev |
| 2016/0315756 A1 | 10/2016 | Tenea et al. |
| 2017/0041126 A1* | 2/2017 | Bergeron ............ H04L 7/0012 |
| 2017/0085581 A1 | 3/2017 | Jackson |
| 2017/0331748 A1 | 11/2017 | Mangin |
| 2018/0041399 A1 | 2/2018 | Robitaille et al. |
| 2018/0070373 A1 | 3/2018 | Muench |
| 2018/0160424 A1 | 6/2018 | Cavalcanti et al. |
| 2018/0184438 A1 | 6/2018 | Cavalcanti et al. |
| 2018/0191642 A1 | 7/2018 | Biederman et al. |
| 2018/0227067 A1 | 8/2018 | Hu et al. |
| 2018/0237039 A1 | 8/2018 | Mong et al. |
| 2018/0302330 A1 | 10/2018 | Bush |
| 2018/0302331 A1 | 10/2018 | Bush |
| 2018/0309655 A1 | 10/2018 | Joseph et al. |
| 2018/0309656 A1 | 10/2018 | Regev |
| 2018/0316592 A1 | 11/2018 | Ellegaard |

FOREIGN PATENT DOCUMENTS

| | | |
|---|---|---|
| DE | 10 2018 109 689 A1 | 10/2018 |
| EP | 3 284 244 B1 | 12/2019 |
| WO | WO 2011/144263 A1 | 11/2011 |
| WO | WO 2016/168063 A1 | 10/2016 |
| WO | WO 2016/168064 A1 | 10/2016 |
| WO | WO 2017/052714 A1 | 3/2017 |

OTHER PUBLICATIONS

Non-Final Office Action for U.S. Appl. No. 14/688,644 (dated Jul. 26, 2017).

Notice of Allowance and Fee(s) Due for U.S. Appl. No. 14/809,513 (dated Nov. 7, 2017).

Communication of the Extended European Search Report for European Patent Application Serial No. 16780481.4 (dated Sep. 6, 2018).

Notice of Allowance and Fee(s) Due for U.S. Appl. No. 14/819,337 (dated Jun. 21, 2017).

Notice of Allowance and Fee(s) Due and Examiner Initiated Interview Summary for U.S. Appl. No. 14/860,630 (dated Jun. 13, 2017).

Non-Final Office Action for U.S. Appl. No. 14/809,513 (dated May 30, 2017).

Notice of Allowance and Fee(s) Due for U.S. Appl. No. 14/688,630 (dated Apr. 12, 2017).

Non-Final Office Action for U.S. Appl. No. 14/819,337 (dated Mar. 2, 2017).

Notice of Allowance and Fee(s) Due for U.S. Appl. No. 14/685,552 (dated Mar. 1, 2017).

Notice of Allowance and Fee(s) Due for U.S. Appl. No. 13/933,661 (dated Feb. 17, 2017).

Non-Final Office Action for U.S. Appl. No. 14/860,630 (dated Dec. 19, 2016).

Non-Final Office Action for U.S. Appl. No. 14/685,552 (dated Oct. 20, 2016).

Non-Final Office Action for U.S. Appl. No. 14/688,630 (dated Oct. 17, 2016).

Non-Final Office Action for U.S. Appl. No. 13/933,661 (dated Sep. 27, 2016).

(56) References Cited

OTHER PUBLICATIONS

Notification of Transmittal of the International Search Report and the Written Opinion of the International Searching Authority, or the Declaration for International Application No. PCT/US2016/040532 (dated Sep. 12, 2016).
Notification of Transmittal of the International Search Report and the Written Opinion of the International Searching Authority, or the Declaration for International Application No. PCT/US2016/026534 (dated Jul. 8, 2016).
Notification of Transmittal of the International Searh report and the Written Opinion of the International Searching Authority, or the Declaration for International Application No. PCT/US2016/026533 (dated Jul. 8, 2016).
Final Office Action for U.S. Appl. No. 13/933,661 (dated Apr. 12, 2016).
Non-Final Office Action for U.S. Appl. No. 13/933,661 (dated Dec. 14, 2015).
"External Bypass Switches," Ixia, White Paper, 915-6688-01 Rev. B, pp. 1-5 (Dec. 2015).
"Network Time Protocol," Wikipedia, https://en.wikipedia.org/wiki/Network_Time_ Protocol, pp. 1-7 (Jul. 3, 2015).
"High Density Modular Fiber Tap," Ixia, http://www.ixiacom.com/products/net-optics-flex-tap, pp. 1-4 (Jul. 2014).
Watt et al., "Understanding and Applying Precision Time Protocol," Power and Energy Automation Conference, pp. 1-7 (Mar. 2014).
"Ixia Anue 3500—Mobile Backhaul Testing Solution," Ixia Data Sheet, pp. 1-5 (Dec. 2013).
Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).
"AN-1838 IEEE 1588 Boundary Clock and Transparent Clock Implementation Using the DP83640," Application Report, Texas Instruments, pp. 1-9 (Apr. 2013).
"AN-1728 IEEE 1588 Precision Time Protocol Time Synchronization Performance," Application Report, SNLA098A, Texas Instruments, pp. 1-10 (Apr. 2013).
Spirent, "Precision Time Protocol (PTP) IEEE 1588," YouTube "alantalkstech", https://www.youtube.com/watch?v=yw-gd01aOYg, pp. 1-11 (Dec. 7, 2011).
Eidson, "IEEE-1588 Standard for a Precision Clock Synchronization Protocol for Networked Measurement and Control Systems—A Tutorial," Agilent Technologies, pp. 1-94 (Oct. 2005).
Communication of the Extended European Search Report for European Patent Application Serial No. 16780482.2 (dated Aug. 9, 2018).
Communication of European publication number and information on the application of Article 67(3) EPC for European Patent Application Serial No. 16849136.3 (dated Jul. 4, 2018).
Communication of the extended European search report for European Patent Application Serial No. 16849136.3 (dated Feb. 20, 2019).
Bhunia et al., "Hardware Trojan Attacks: Threat Analysis and Countermeasures," Proceedings of the IEEE, vol. 102, No. 8, pp. 1-20 (Aug. 2014).
Commonly-assigned, co-pending U.S. Appl. No. 16/264,127 for "Methods, Systems, and Computer Readable Media for Detecting and Mitigating Effects of Timing Attacks in Time Sensitive Networks (TSNs)," (Unpublished, filed Jan. 31, 2019).
Commonly-assigned, co-pending U.S. Appl. No. 16/258,485 for "Active Network Tap Supporting Time Sensitive Network (TSN) Standards," (Unpublished, filed Jan. 25, 2019).
"1588v2 Sync and Delay_Req Messages Format," http://support.huawei.com/hedex/pages/EDOC100010596830008125/05/EDOC100010596830008125/05/resources/message/cd_feature_1588v2_format-sync.html, pp. 1-2 (Downloaded Jan. 9, 2019).
Non-Final Office Action for U.S. Appl. No. 15/498,452 (dated Nov. 5, 2018).
Moussa et al., "A Detection and Mitigation Model for PTP Delay Attack in an IEC 61850 Substation", IEEE Transactions on Smart Grid, vol. 9, No. 5, pp. 3954-3965 (Sep. 2018).

"Time-Sensitive Networking Task," Wikipedia, the free encyclopedia, https://en.wikipedia.org/wiki/Time-Sensitive_Networking, pp. 1-7 (Aug. 29, 2017).
Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).
"IEEE Standard for Local and metropolitan area networks—Bridges and Bridged Networks—Amendment 29: Cyclic Queuing and Forwarding," IEEE Computer Society, IEEE Std 802.1QchTM-2017, pp. 1-28 (May 18, 2017).
"IEEE Standard for Local and metropolitan area networks—Bridges and Bridged Networks—Amendment 26: Frame Preemption," IEEE Computer Society, IEEE Std 802.1QbuTM-2016, pp. 1-51 (Jun. 30, 2016).
"IEEE Standard for Local and metropolitan area networks—Bridges and Bridged Networks—Amendment 25: Enhancements for Scheduled Traffic," IEEE Computer Society, IEEE Std 802.1QbvTM-2015, pp. 1-55 (Dec. 5, 2015).
"IEEE Standard for Local and metropolitan area networks—Bridges and Bridged Networks Amendment 24: Path Control and Reservation," IEEE Computer Society, IEEE Std 802.1QcaTM-2015, pp. 1-105 (Sep. 3, 2015).
Finn, "802.1Qav + P802.1Qbv Time-gated Shapers," Cisco System, IEEE 802 Pleanry, pp. 1-12 (Nov. 5, 2014).
Boiger, "Deterministic Ethernet—IEEE 802.1 standards for real-time process control, industrial automation, and vehicular networks," IEEE 802 Tutorial, pp. 1-72 (Nov. 12, 2012).
Boiger, "Time Aware Shaper," Deggendorf University of Applied Sciences, IEEE 802.1 Pleanry, pp. 1-12 (Sep. 2012).
"IEEE Standard for Local and metropolitan area networks—Timing and Synchronization for Time-Sensitive Applications in Bridged Local Area Networks," IEEE Computer Society, IEEE Std.802.1ASTM-2011, pp. 1-274 (Mar. 30, 2011).
Ullmann et al., "Delay Attacks—Implication on NTP and PTP Time Synchronization", ISPCS 2009 International IEEE Symposium on Precision Clock Synchronization for Measurement, Control, and Communication, pp. 1-6 (Oct. 12-16, 2009).
"Precision Clock Synchronization the Standard IEEE 1588", Hirschmann, White Paper, pp. 1-20. (Feb. 2009).
"IEEE 1588 Precise Time Protocol: The New Standard in Time Synchronization" Microsemi Power Matters, White Paper, pp. 1-10 (Copyright 2005-2017).
Commonly-assigned, co-pending U.S. Appl. No. 16/415,790 for "Indirect Testing Using Impairment Rules," (Unpublished, filed May 17, 2019).
Non-Final Office Action for U.S. Appl. No. 15/647,207 (dated May 15, 2019).
Notice of Allowance and Fee(s) Due for U.S. Appl. No. 15/498,452 (dated May 10, 2019).
"Principles of Chaos Engineering", https://principlesofchaos.org/, pp. 1-2 (May 2018).
"Time-Sensitive Networking," Wikipedia, the free encyclopedia, https://en.wikipedia.org/wiki/Time-Sensitive_Networking, pp. 1-7 (Sep. 28, 2017).
Communication under Rule 71(3) EPC for European Patent Application Serial No. 16 780 481.4 (dated May 7, 2019).
Advisory Action and AFCP 2.0 Decision for U.S. Appl. No. 15/647,207 (dated Nov. 27, 2019).
Decision to grant a European patent pursuant to Article 97(1) EPC for European Patent Application Serial No. 16780481.4 (dated Sep. 12, 2019).
Final Office Action for U.S. Appl. No. 15/647,207 (dated Sep. 12, 2019).
Communication under Rule 71(3) EPC Intention to Grant for European Patent Application Serial No. 16 780 482.2 (dated Jul. 9, 2019).
Communication of European publication number and information on the application of Article 67(3) EPC for European Patent Application Serial No. 16780482.2 (dated Jan. 24, 2018).
Communication of European publication number and information on the application of Article 67(3) EPC for European Patent Application Serial No. 16780481.4 (dated Jan. 24, 2018).

(56) References Cited

OTHER PUBLICATIONS

Decision to grant a European patent pursuant to Article 97(1) EPC for European Patent Application Serial No. 16780482.2 (dated Nov. 21, 2019).

Alhady et al., "Time-aware Traffic Shaper using Time-based Packet Scheduling in Intel I210," International Journal of Research and Engineering, vol. 5, No. 9, pp. 494-499 (Sep.-Oct. 2018).

Wisniewski et al., "Seamless Schedule Switching in Time Triggered Ethernet based Communication Systems," ResearchGate, pp. 1-11 (Nov. 2015).

Thangamuthu et al., "Analysis of Ethernet-Switch Traffic Shapers for In-Vehicle Networking Applications," Design, Automation & Test in Europe Conference & Exhibition, pp. 1-6 (2015).

Thangamuthu, S., Analysis of Automotive Traffic Shapers in Ethernet In-Vehicular Networks, Eindhoven University of Technology, Master's Thesis pp. 1-89 (Aug. 2014).

Boiger, Christain, "Time Aware Shaper," IEEE 802 Plenary, Deggendorf University of Applied Sciences, pp. 1-9 (May 2012).

Communication under Rule 71(3) EPC Intention to Grant for European Patent Application Serial No. 16 849 136.3 (dated Dec. 12, 2019).

Notice of Allowance and Fee(s) Due for U.S. Appl. No. 15/647,207 (dated Jan. 15, 2020).

\* cited by examiner

METHODS, SYSTEMS, AND COMPUTER READABLE MEDIA FOR MONITORING, ADJUSTING, AND UTILIZING LATENCY ASSOCIATED WITH ACCESSING DISTRIBUTED COMPUTING RESOURCES

TECHNICAL FIELD

The subject matter described herein relates to monitoring latency associated with accessing distributed computing resources. More particularly, the subject matter described herein relates to monitoring, adjusting, and utilizing latency associated with accessing distributed computing resources.

BACKGROUND

As computing has changed from an on-premises model to a cloud services model where resources are distributed, differences in latency can adversely affect a user's experience and even prevent applications from functioning. For example, a user accessing cloud service expects the latency in accessing the service to be the same or nearly the same each time the user accesses the service, regardless of the physical location from which the service is provided.

Applications, such as database mirroring and synchronization applications, likewise expect minimal variation in latency between accesses to database resources located at different sites. For example, a database application synchronizing its local database with databases located at different remote sites expects the latency associated with the synchronization operations to be substantially equal. If the latency associated with synchronizing a database located at one site is different from the latency associated with synchronizing a database located at a different site is not equal, the database synchronization application may block access to the database at all sites until all synchronization operations are complete.

Another problem associated with variations in latencies between distributed computing resources is that such variations can mask network security issues. For example, a non-deterministic latency variation can be exploited by an attacker to mask attacks that involve intercepting traffic, modifying the traffic to include malicious code, and retransmitting the modified traffic to a target network. Even though intercepting, modifying, and retransmitting packets introduces latency into transactions involving the packets, such latency may be difficult to detect if variation in the natural latency (i.e., latency not caused by attacks) is non-deterministic.

Accordingly, in light of these difficulties, there exists a need for monitoring, adjusting, and utilizing latency associated with accessing distributed computing resources.

SUMMARY

Methods, systems, and computer readable media for monitoring, adjusting, and utilizing latency associated with accessing distributed computing resources are disclosed. One method includes measuring a first latency associated with accessing a first computing resource located at a first site. The method further includes the measuring a second latency associated with accessing a second computing resource located at a second site different from the first site. The method further includes selectively impairing transmission of packets to or processing of packets by at least one of the first and second computing resources in accordance with a performance, network security, or diagnostic goal.

The term "computing resource", as used herein, refers to any one or more of processing, storage, or other resources involving one or more computers.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
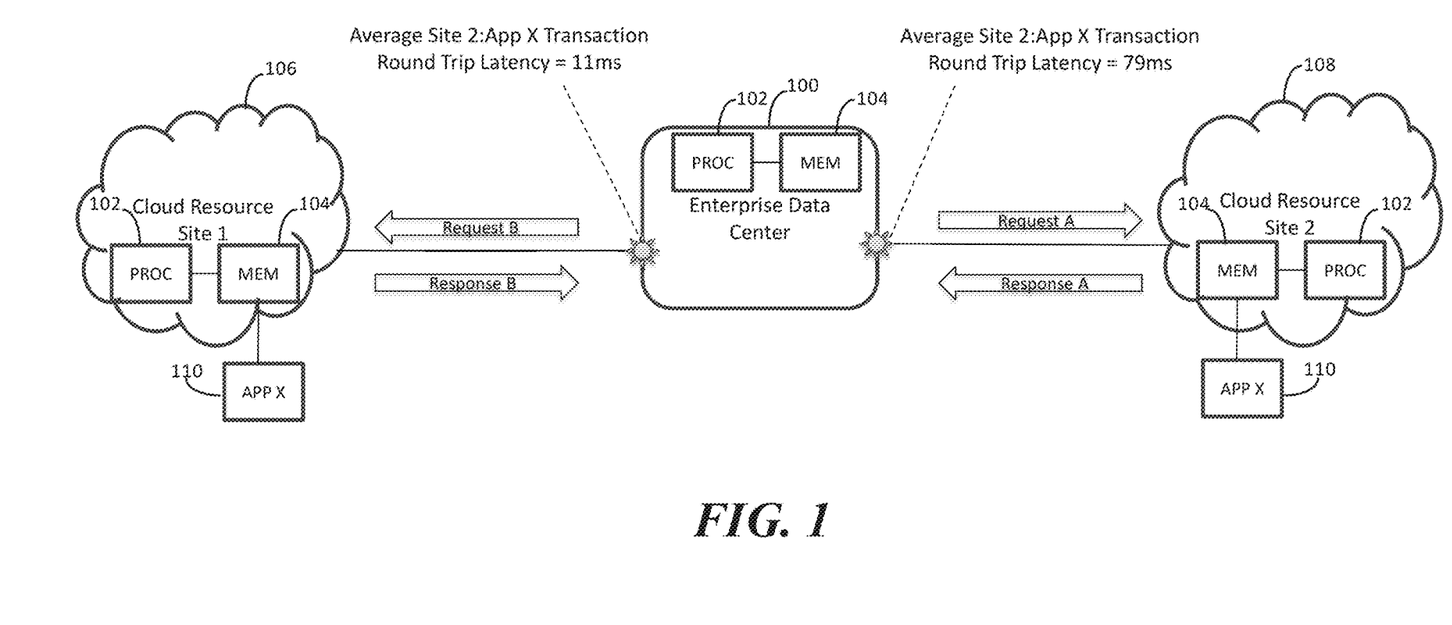
FIG. 1 is a network diagram demonstrating an exemplary operating environment for monitoring, adjusting, and utilizing latency associated with accessing computing resources locating at different sites according to an aspect of the subject matter described herein.

Methods, systems, and computable readable media for monitoring, adjusting, and utilizing latency associated with accessing distributed computing resources are disclosed. FIG. 1 is a network diagram illustrating an exemplary operating environment for the subject matter described herein. Referring to FIG. 1, an enterprise data center 100 includes computing resources, such as one or more processors 102 and memory 104 for providing computing services, such as cloud computing and/or storage services. To provide such services in a geo-redundant manner, enterprise data center 100 will have access to computing resources located at geographically distributed sites. In the illustrated example, enterprise data center 100 has access to a first computing resource 106 located at a first site and a second computing resource 108 located at a second site, where the first and second computing sites are geographically distributed from each other. Each computing resource 106 and 108 may include one or more processors 102 and memory 104. Together, data center 100 and remote computing resources 106 and 108 may be cloud computing resources that provide cloud computing services.

In addition, in the illustrated example, distributed computing resources 106 and 108 each include an application 110 that provides a service. Application 110, in one example, may be a database application that accesses a database. Application 110 may provide the same service at either of the geographically distributed computing sites.

Because application 110 implemented at computing resource 106 provides the same service as application 110 at computing resource 108, data center 100 can request service from either instance of application 110. The latency experienced by data center 100 or the end user may vary depending on which instance of application 110 is providing the service. The latency variation can be caused by differences in relative congestion in the networks between data center 100 and computing resources 106 and 108 or by the relative loading of computing resources 106 and 108. Such differences latency can cause applications to fail and or can result in security threat. Regarding security threats, an attacker can intercept and modify requests between data center 100 and computing resources 106 and 108 without detection if the latency between data center 100 and computing resources 106 and 108 is not deterministic.

Figure 2:
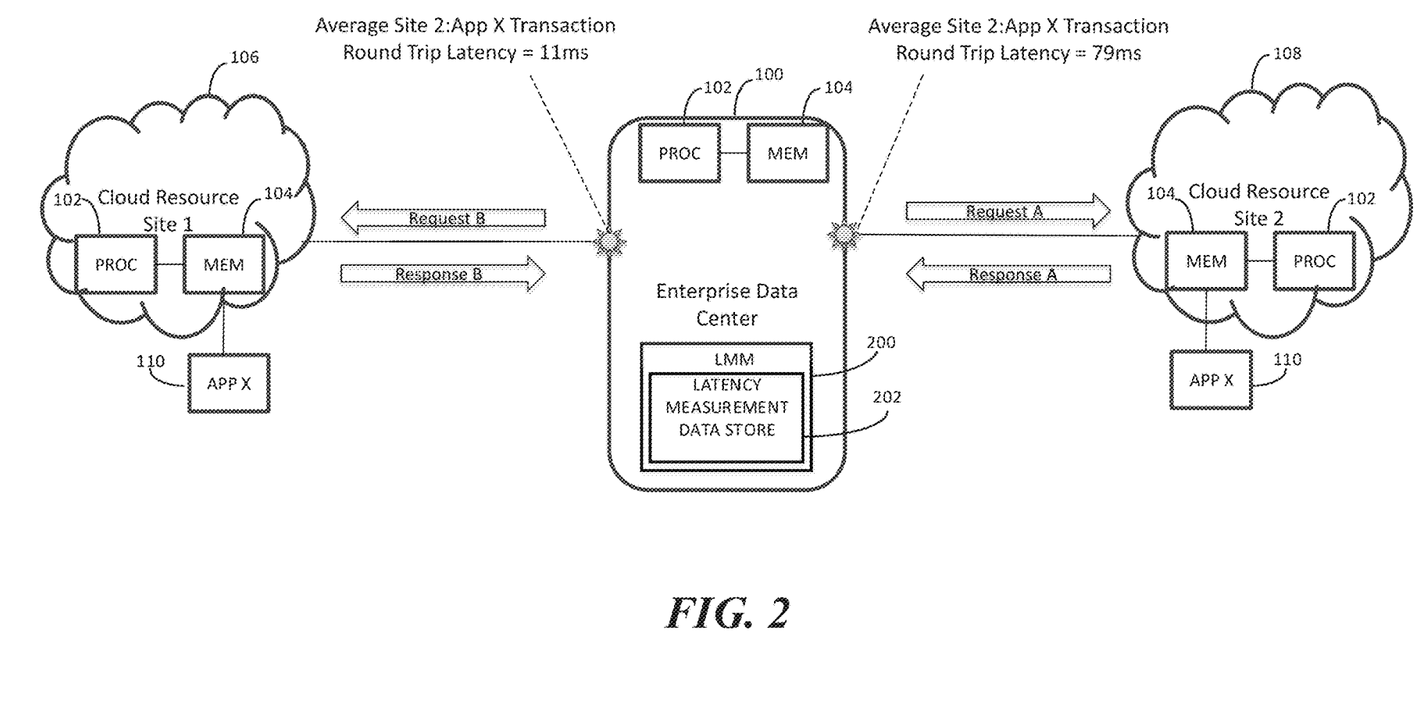
FIG. 2 is a network diagram illustrating a method for measuring latencies associated with accessing computing resources located at different sites according to an aspect of the subject matter described herein.

FIG. 2 is a network diagram illustrating an aspect of the subject matter described herein where enterprise data center 100 includes a latency measurement module 200 that measures round trip packet latencies between data center 100 and remote computing resources 106 and 108. In FIG. 2, latency measurement module 200 may be implemented by processor 102 and stored in memory 104. Latency measurement module 200 measures round trip latency by transmitting test packets, illustrated as test request A and test request B, to each of remote computing resources 106 and 108, receiving responses from remote computing resources 106 and 108, and measuring the round trip time from the times that requests are transmitted to remote computing resources 108 to the times that responses are received from remote computing resources 106 and 108. In this example, the latency includes the network latency and the latency caused by processing at remote computing resources 106 and 108. Latency measurement module 200 may maintain a data store 202 of per site latency measurements. In the illustrated example, the average round trip latency between data center 100 and remote computing resource 108 is 79 milliseconds, while the average round trip latency for the same type of transaction between data center 100 and remote computing resource 106 is 11 milliseconds.

Although in the example illustrated in FIG. 2, latency measurement module 200 measures latency based on test packets generated by latency measurement module 200, the subject matter described herein is not limited to such an implementation. In an alternate implementation, latency measurement module 200 may measure the latency of live network traffic between enterprise data center 100 and each of remote computing resources 106 and 108. For example, if a non-test application associated with data center 100 sends a request packet to remote computing resource 108, latency measurement module 200 may record the outgoing transmission timestamp of the request packet. When a response packet from remote computing resource 108 is received by data center 100, latency measurement module 200 may record the time of receipt. The latency may then be recorded for the particular transaction and computing site to be the difference between the transmission time of the request packet and the time of receipt of the response packet. Similar measurements may be performed for transactions between data center 100 and remote computing resource 106 to calculate and store the latency between enterprise data center 100 and remote computing resource 106.

It should be noted that in this example, the latency measured is round trip latency. It is also possible to measure one way latency. One way latency can be estimated by dividing the round trip latency by two, assuming that the delay in the network is relatively symmetric. If the network delay is not symmetric, one-way latency can be measured using the method described in commonly assigned, co-pending U.S. Patent Application Publication No. 2016/0301589, the disclosure of which is incorporated herein by reference in its entirety. Briefly, this method includes transmitting a packet from a first network device, intercepting the packet, and transmitting a copy of the packet back to the first network device. Another copy of the packet is sent to a second network device. The first network device records the time of receipt of the copy of the packet that it received. The second network device records the time of the receipt of the copy of the packet that it received. The second network device transmits the packet back to the first network device where the packet is intercepted and the difference between the recorded times of receipt of the two copies by the first and second network devices is computed as the one way link delay from the first network device to the second device. The one-way link delay may be used as a measurement of one-way latency.

Figure 3:
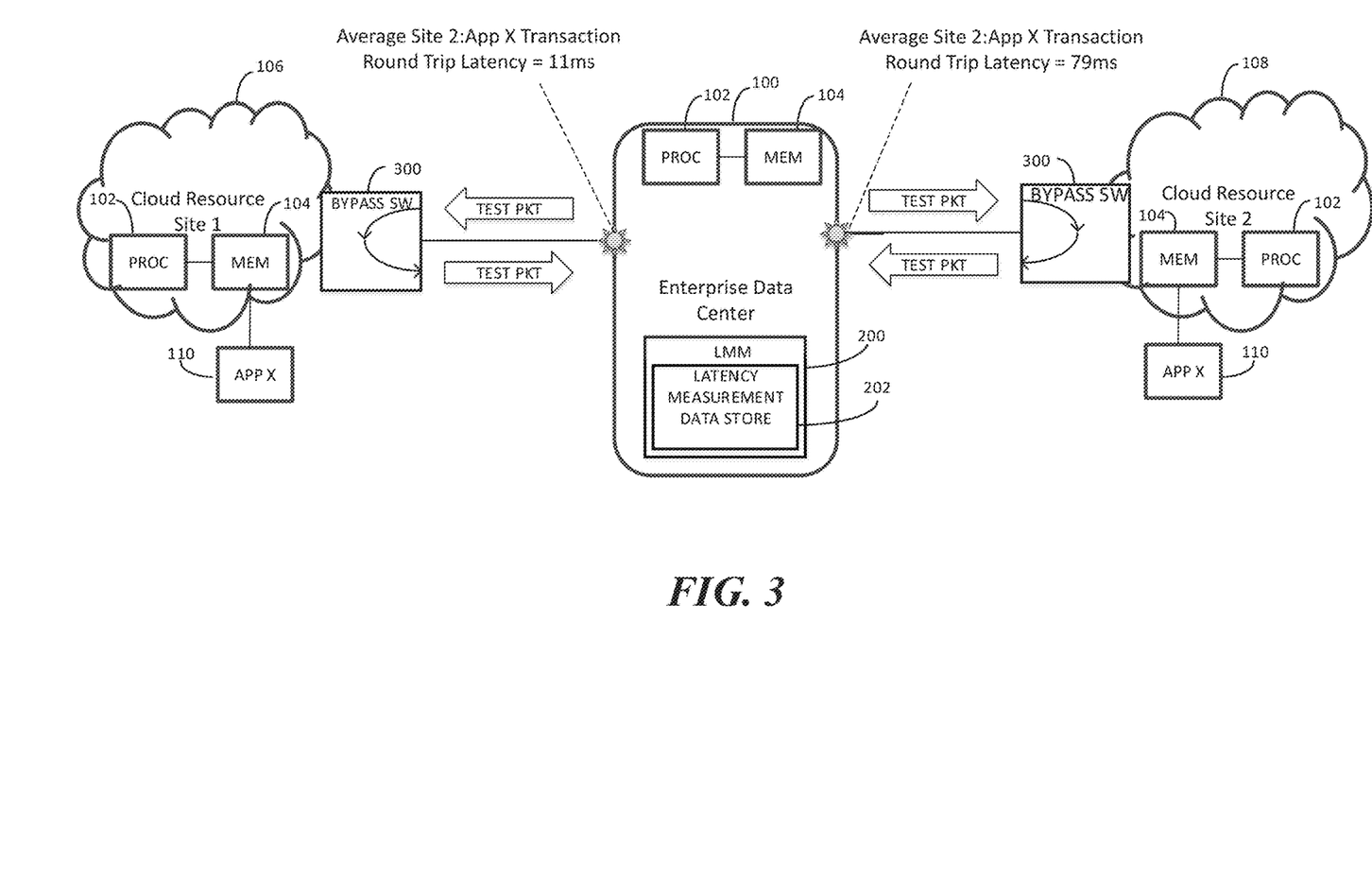
FIG. 3 is a network diagram illustrating an alternate method for measuring latencies associated with accessing computing resources located at different sites including to an aspect of the subject matter described herein.

In yet another alternate implementation, latency measurement module 200 may measure latency between enterprise data center 100 and each of the remote computing resources 106 and 108 using a bypass switch located at each of remote computing resources 106 and 108 to loop test packets transmitted by data center 100 back to data center 100. FIG. 3 illustrates this example. In FIG. 3, latency measurement module 200 transmits test packets to each of remote computing resources 106 and 108. A bypass switch 300 located at each of remote computing resources 106 and 108 loops the test packet back to latency measurement module 200. Latency measurement module 200 measures the round trip latency associated with a network between enterprise data center 100 and remote computing resources 106 and 108 based on the transmission time of each request message and the time that the request is looped back and received by data center 100. Such round trip latency does not include processing latency at the remote computing resources. However, measuring network delay can be useful to isolate the causes of latency problems. Again, one way latency can also be determined using the methodology illustrated in FIG. 3 by dividing the round trip latency by two. However, such an approximation is only valid if the latency in the network is relatively symmetric. In the case of asymmetric network delay, an alternate method, such as the one described above can be utilized.

Figure 4:
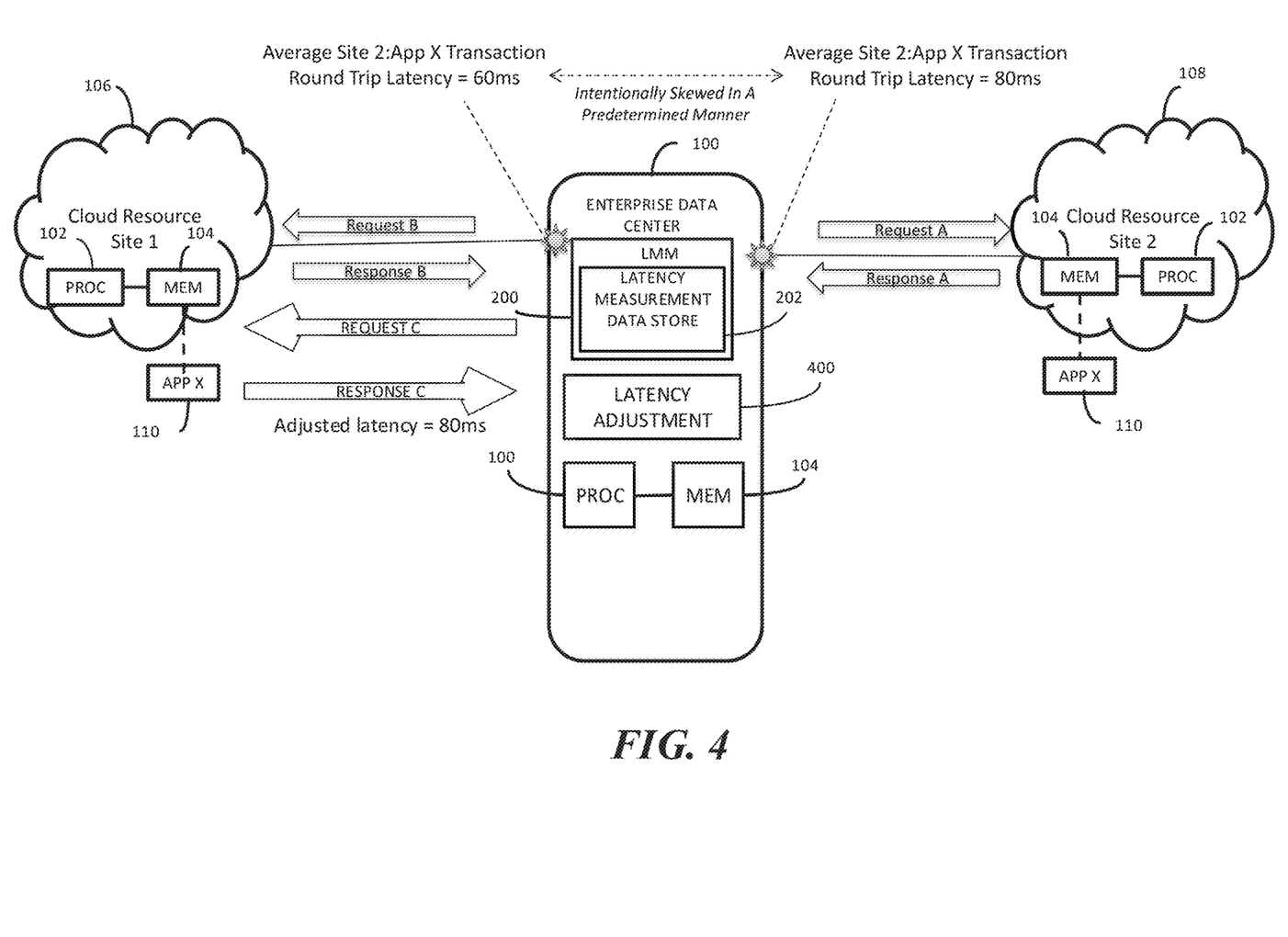
FIG. 4 is a network diagram illustrating selective impairment of packets transmitted to computing resources located at different sites according to an aspect of the subject matter described herein.

Once latency between distributed computing resources has been measured, the latency can be adjusted according to a desired performance, diagnostic, or network security goal. In one example, it may be desirable to ensure that the latency between services provided by different computing resources is substantially equal. FIG. 4 illustrates an exemplary implementation of a latency adjustment module 400 implemented by processor 102 in data center 100 that selectively impairs transmission of packets transmitted to remote computing resources 106 and 108 to achieve either latency equalization or a difference in latency that is within the tolerance of an application. Referring to FIG. 4, latency measurement module 200 measures latency between data center 100 and remote computing resources 106 and 108 using any of the methods described above. Based on these measurements and a desired performance, diagnostic, or network security goal, latency adjustment module 400 adjusts the latency of packets transmitted to remote computing resources 106 and/or 108. In the illustrated example, latency associated with accessing remote computing resource 106 is measured or calculated as 60 ms and latency associated with accessing computing resource 108 is measured or calculated as 80 ms. If it is desirable to equalize the latency, latency adjustment module 400 may add 20 milliseconds of delay to packets transmitted from data center 100 to remote computing resource 106 relative to packets transmitted from data center 100 to remote computing resource 108. In the illustrated example, the adjusted latency for the transaction between data center 100 and remote computing resource 106 involving request C and response C is 80 ms. The adjusted latency matches the measured latency for the transaction involving request A and response A between data center 100 and remote computing resource 108. Latency measurement and selective insertion of delay impairment may be performed continually so that the latency experienced by data center 100 for transactions with remote applications 110 is substantially equal.

In another example, it may not be desirable to maintain equal latency between transactions performed by different remote sites but instead to maintain deterministic but unequal latency. Maintaining deterministic but unequal latency may include selectively impairing packets between data center 100 and remote computing resources 106 and 108 so that the latency variation and/or the difference in measured latency is deterministic. In one example, it may be desirable to adjust latency so that the latency experienced by packets accessing application 110 at remote computing resource 106 is within the tolerance of an application with respect to delays experienced by packets accessing application 110 at remote computing resource 108. In another example, it may be desirable to modulate latency by selective impairment of the transmission of packets from data center 100 so that the latency or the difference in latencies between data center 100 and remote computing resources 106 and 108 varies according to a schedule or deterministic pattern.

Figure 5:
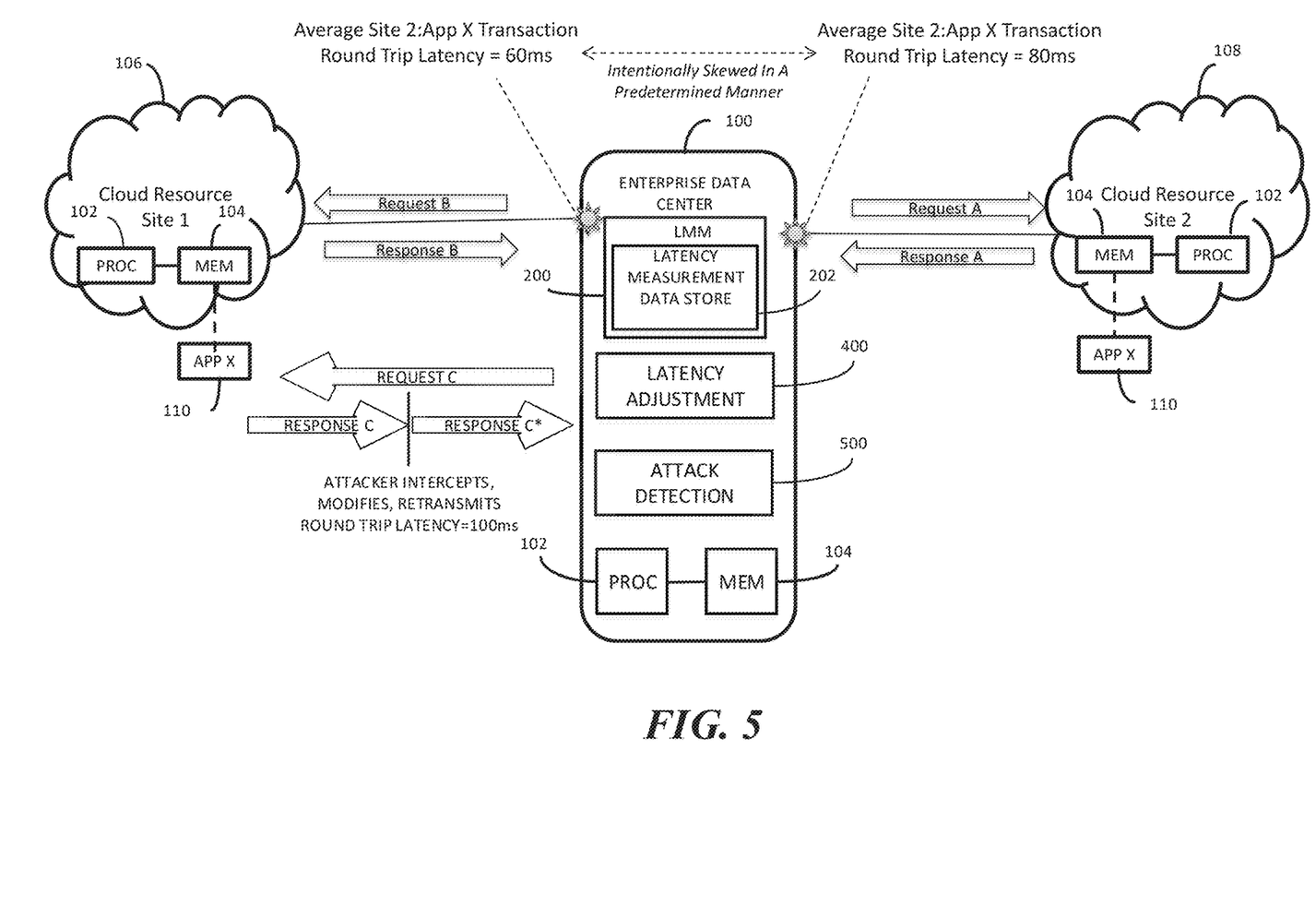
FIG. 5 is a network diagram illustrating an exemplary process for utilizing variations in latency to detect an attack according to an aspect of the subject matter described herein.

FIG. 5 is a network diagram illustrating the use of variations from adjusted latency to detect the presence of an attack. Referring to FIG. 5, in addition to latency measurement module 200 and latency adjustment module 400, data center 100 includes an attack detection module 500. Attack detection module 500 monitors latency of transactions between data center 100 and remote computing resources 106 and 108. Attack detection module 500 determines whether the monitored latency varies according to the predetermined schedule. If attack detection module 500 determines that latency associated with accessing remote computing resources 106 and 108 indicates the presence of an attack. Continuing with the example from FIG. 4, if latency adjustment module 400 adds 20 ms of latency to request C, the expected latency for the transaction involving request C and response C would be 80 ms, as illustrated in FIG. 4. However, in FIG. 5, an attacker intercepts response C, modifies response C to include attack code, and retransmits response C as response C*.

When enterprise data center 100 receives response C*, attack detection module 500 determines that the round trip latency for response C* is 100 ms, which is a 25% increase over the expected round trip latency of 80 ms for transactions with remote computing resource 106. Accordingly, attack detection module 500 may determine that the variation in latency indicates the presence of an attack and generate an alarm or take other action, such as quarantining response C* for offline analysis in a protected environment.

In yet another example, latency adjustment module 400 may adjust the latency for transactions between data center 100 and either or both of remote computing resources 106 and 108 to vary according to a predetermined schedule. For example, latency adjustment module 400 may adjust the latency for transactions between data center 100 and remote resource 106 to be 60 ms for a time period, 80 ms for a subsequent time period, and then back to 60 ms in a repeating pattern. If an attacker intercepts and inserts attack code into packets between data center 100 and remote computing resource 106, attack detection module 500 will detect a variation in latency from the predetermined pattern. If such a variation is detected, attack detection module 500 may generate an alarm and or take other appropriate action.

Figure 6A:
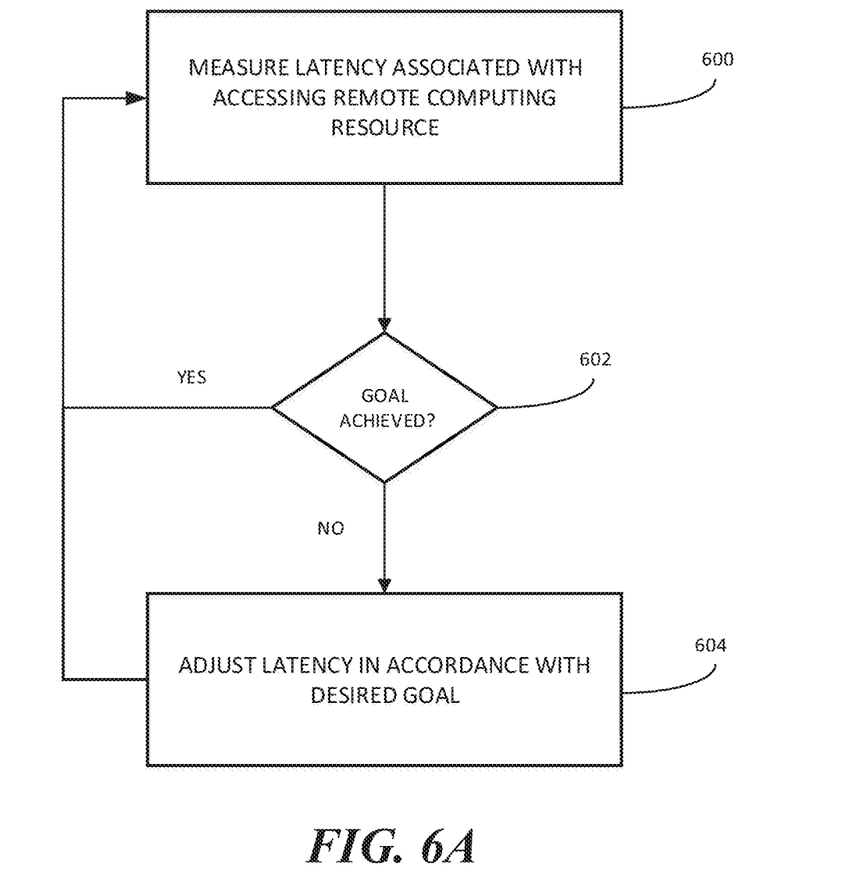
FIG. 6A is a flow chart illustrating an exemplary process for monitoring and adjusting latency associated with accessing computing resources located at different sites according to an aspect of the subject matter described herein.

FIG. 6A illustrates an exemplary process for measuring and adjusting latency associated with transactions involving distributed computing resources according to the aspect of the subject matter described herein. Referring to FIG. 6A, in step 600, latencies associated with accessing remote computing resources are measured. The measuring can be performed by latency measuring module 200 using any of the methods described above. In step 602, it is determined whether the measured latency achieves a desired latency goal, such as a performance, diagnostic, or network security goal. If the latency achieves the desired goal, control returns to step 600 where the process of measuring and comparing the latency to a desired goal is repeated.

If, in step 602 the latency does not achieve the desired goal, control proceeds to step 604 where the latency is adjusted in accordance with the goal. The adjustment will be effected using latency adjustment module 400 to selectively impair packets transmitted to one or both remote computing resources. Control then returns to step 600 where the process of measuring and comparing latency to the desired goal re-starts.

Figure 6B:
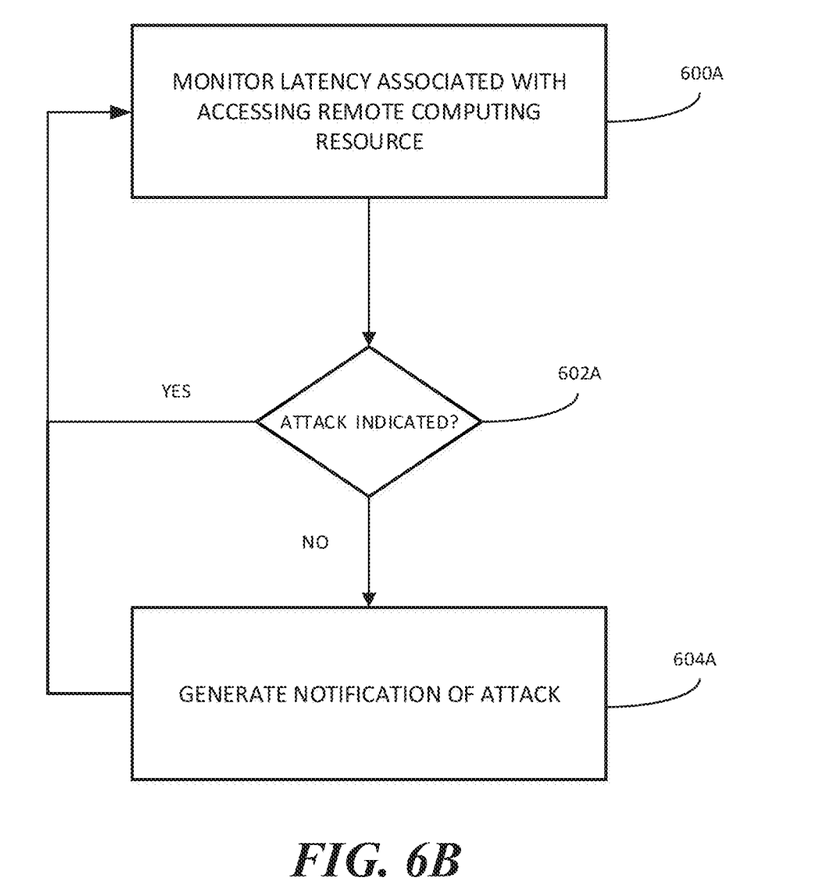
FIG. 6B is a flow chart illustrating an exemplary process for utilizing variations in latency to detect attacks according to an aspect of the subject matter described herein.

The process for determining whether variations in latency indicate an attack may be performed in parallel with the latency measured and adjustment steps in FIG. 6A. FIG. 6B illustrates exemplary steps that may be performed in determining whether variations in latency associated with accessing remote computing resources are indicative of an attack. Referring to FIG. 6B, in step 604A, latency associated with accessing a remote computing resource is monitored. For example, attack detection module 500 may monitor latencies of packets accessing remote computing resources 106 and 108. In step 604B, it is determined whether the monitored latencies are indicative of an attack. As described above, in one example, an attack may be indicated if latency of a given packet varies more than a threshold amount from an average latency or from an adjusted latency. If the monitored latency is indicative of an attack, control proceeds to step 604A where an indication of an attack (such as an alarm) is generated. Control then returns to step 600A where latency monitoring is continued. If in in step 602A, it is determined that an attack is not indicated, control returns to step 600A where latency monitoring and attack detection continues.

Although in the examples described above, latency is measured and adjusted at enterprise data center 100, the subject matter described herein is not limited to such an implementation. In an alternate implementation, latency can be measured in any computing site that contains computing resources. For example, in FIG. 2, latency adjustment, measurement, and attack detection can be performed at any one or more of data center 100, remote computing resources 106, or remote computing resources 108.

In the examples described above, latency adjustment includes equalizing latency associated with application computing resources at different sites. In another example, latency adjustment includes modulating latency so that latency between two or more computing resources varies deterministically. In yet another alternate example, latency adjustment module 400 may adjust latencies to give priority to one computing site over another. For example, in FIG. 4, if remote computing resource 106 is assigned a higher priority than remote computing resource 108, latency adjustment module 400 may adjust the latency so that transactions involving remote computing resource 106 experience less latency than transactions involving remote computing resource 108.

In the examples described above, latency is measured and adjusted on two different network paths. However, the subject matter described herein is not limited to the measuring and adjusting latency on only two network paths. Measuring and adjusting latency on any number of network paths to achieve a desired performance, security, or diagnostic goal is intended to be within the scope of the subject matter described herein. For example, in a cloud computing network where computing resources are accessible via n different network paths, n being an integer, latency may be equalized across all n of the network paths. In another example, latency may be adjusted on the n network paths to achieve a desired priority among the n network paths or their associate resources.

In the examples described above, latency is adjusted to achieve a desired performance or security goal. Latency may also be adjusted according to a desired diagnostic goal. For example, in FIG. 4, latency adjustment module 400 may gradually increase the latency experienced by transactions involving remote computing resources 106 and 108. A performance monitor associated with enterprise data center 100 may monitor the response of data center 100 or computing resources 106 and 108 to the increase in latency. For example, the performance monitor may determine whether enterprise data center 100 properly fails over to another remote computing site when the latency associated with one remote computing site exceeds a latency threshold. Similarly, if latency adjustment module 400 decreases the latency from a value that caused a failover back to a natural latency level, the performance monitor may determine whether enterprise data center 100 fails back to using the remote computing resource for which the latency is decreased. The performance monitor may also monitor the performance of applications to see whether they crash or recover as latency is changed.

In the examples described above, latency is measured and adjusted on a per packet or per site basis. In an alternate implementation, latency may be measured and adjusted on a per link (physical or virtual), per port (physical or virtual), per traffic type (e.g., all hypertext transfer protocol (HTTP) traffic, all real time transport protocol (RTP) traffic, etc.), or per application (all Netflix traffic, all Twitter traffic, all Facebook traffic, etc.). Latency may be measured and adjusted, for example, on a per application basis and the performance of the application to the change in latency may be monitored.

In the security examples described above, variations in latency are used to detect an attack. The variations used for attack detection may be variations in latency over time on one link or across more than one link. In addition, a deterministic latency signature of a link or a group of links may be changed over time to change the latency baseline used to detect potential attacks. If an attack is detected, in the examples described above, an alarm is generated. Other actions that can be taken include isolating a resource, taking down a link, killing a virtual machine (VM) instance, etc. In one example, attack detection module 500 may access a data structure that contains security rules corresponding to different applications or computing resources. For example, if a potential attack is detected due to a variation in latency associated with one or more cloud sites, attack detection module 500 may look up the cloud sites in the data structure, access the corresponding rule and perform the security action or actions specified by the rule. Examples of security actions include any of the actions described above.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for monitoring, adjusting, and utilizing latency associated with accessing distributed computing resources, the method comprising:
    measuring a first latency associated with accessing a first computing resource located at a first site;
    measuring a second latency associated with accessing a second computing resource located at a second site different from the first site;
    selectively impairing transmission of packets to or processing of packets by at least one of the first and second computing resources to adjust latency associated with accessing at least one of the first and second computing resources in accordance with a performance, diagnostic, or network security goal, wherein selectively impairing transmission of packets to or processing of packets by at least one of the first and second computing resources includes adding delays to the transmission of request packets to the first computing resource so that latencies associated with accessing the first computing resource vary deterministically according to a schedule;
    receiving responses from the first computing resource;
    determining an expected latency for one of the responses using the schedule; and
    determining that the one response indicates the presence of an attack when a measured latency for the one response exceeds the expected latency for the one response, wherein measuring the first and second latencies includes transmitting test packets to each of the first and second computing resources, looping the test packets back from the first and second computing resources, and determining round trip times for the packets as the first and second latencies.

2. The method of claim 1, wherein measuring the first and second latencies includes monitoring live network traffic transmitted to the first and second computing resources and determining round trip times for the live network traffic as the first and second latencies.

3. The method of claim 1, wherein adding delays to transmission of request packets to the first computing resource includes adding the delays to the transmission of the request packets to make the first and second latencies substantially equal to each other.

4. The method of claim 1, wherein adding delays to the transmission of request packets to the first computing resource includes adding the delays to the transmission of the request packets such that a difference between the first and second latencies is within a tolerance.

5. The method of claim 1, comprising detecting the presence of an attack based on a variation in the first latency, the second latency, or a difference between the first and second latencies.

6. The method of claim 5, comprising, in response to detecting the presence of an attack, performing a security action.

7. The method of claim 1, wherein the first and second computing resources comprise cloud computing resources and wherein adjusting the first and second latencies includes equalizing the latencies between the cloud computing resources.

8. A system for monitoring, adjusting, and utilizing latency associated with accessing distributed computing resources, the system comprising:
a latency measurement module for measuring a first latency associated with accessing a first computing resource located at a first site and a second latency associated with accessing a second computing resource located at a second site different from the first site;
a latency adjustment module for selectively impairing transmission of packets to or processing of packets by at least one of the first and second computing resources to adjust latency associated with accessing at least one of the first and second computing resources in accordance with a performance, diagnostic, or network security goal, wherein selectively impairing transmission of packets to or processing of packets by at least one of the first and second computing resources includes adding delays to the transmission of request packets to the first computing resource so that latencies associated with accessing the first computing resource vary deterministically according to a schedule;
an attack detection module for receiving responses from the first computing resource, determining an expected latency for a one of the responses using a schedule, determining that the one response indicates the presence of an attack when a measured latency for the one response exceeds the expected latency for the one response; and
first and second loopback switches respectively associated with the first and second computing resources and wherein the latency measurement module is configured to transmit test packets to each of the first and second computing resources, the first and second loopback switches loop the test packets from the first and second computing resources to the latency measurement module, and the latency measurement module determines round trip times for the test packets as the first and second latencies.

9. The system of claim 8, wherein the latency measurement module is configured to measure the first and second latencies by monitoring live network traffic transmitted to the first and second computing resources and determining round trip times for the live network traffic as the first and second latencies.

10. The system of claim 8, wherein the latency adjustment module is configured to add the delays to transmission of the request packets to the first computing resource to make the first and second latencies substantially equal to each other.

11. The system of claim 8, wherein the latency adjustment module is configured to add the delays to the transmission of packets to the first computing resource such that a difference between the first and second latencies is within a tolerance.

12. The system of claim 8, wherein the attack detection module is configured to detect the presence of an attack based on a variation in the first latency, the second latency, or a difference between the first and second latencies.

13. The system of claim 12, wherein the attack detection module is configured to, in response to detecting the presence of an attack, perform a security action.

14. The system of claim 8, wherein the first and second computing resources comprise cloud computing resources and wherein adjusting the first and second latencies includes equalizing the latencies between the cloud computing resources.

15. A non-transitory computer readable medium having stored thereon executable instructions that when executed by a processor of a computer control the computer to perform steps comprising:
measuring a first latency associated with accessing a first computing resource located at a first site;
measuring a second latency associated with accessing a second computing resource located at a second site different from the first site;
selectively impairing transmission of packets to or processing of packets by at least one of the first and second computing resources to adjust latency associated with accessing at least one of the first and second computing resources in accordance with a performance, diagnostic, or network security goal, wherein selectively impairing transmission of packets to or processing of packets by at least one of the first and second computing resources includes adding delays to the transmission of request packets to the first computing resource so that latencies associated with accessing the first computing resource vary deterministically according to a schedule;
receiving responses from the first computing resource;
determining an expected latency for one of the responses using the schedule; and
determining that the one indicates the presence of an attack when a measured latency for the one response exceeds the expected latency for the one response, wherein measuring the first and second latencies includes transmitting test packets to each of the first and second computing resources, looping the test packets back from the first and second computing resources, and determining round trip times for the packets as the first and second latencies.

* * * * *